US007416601B2

(12) United States Patent  
Erk et al.

(10) Patent No.: US 7,416,601 B2  
(45) Date of Patent: Aug. 26, 2008

(54) BLACK PERYLENE PIGMENTS

(75) Inventors: Peter Erk, Frankenthal (DE); Andreas Stohr, Freinsheim (DE); Arno Boehm, Mannheim (DE); Walter Kurtz, Bad Duerkheim (DE); Jin Mizuguchi, Yokohama (JP); Benno Sens, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 50 days.

(21) Appl. No.: 10/587,361

(22) PCT Filed: Feb. 4, 2005

(86) PCT No.: PCT/EP2005/001139

§ 371 (c)(1),  
(2), (4) Date: Jul. 26, 2006

(87) PCT Pub. No.: WO2005/078023

PCT Pub. Date: Aug. 25, 2005

(65) Prior Publication Data  
US 2007/0151478 A1    Jul. 5, 2007

(30) Foreign Application Priority Data  
Feb. 11, 2004 (DE) ............ 10 2004 007 382  
Nov. 30, 2004 (DE) ............ 10 2004 057 876

(51) Int. Cl.  
C09B 67/20 (2006.01)  
C09B 3/14 (2006.01)  
C09B 3/18 (2006.01)  
C09B 5/00 (2006.01)  
C09B 5/62 (2006.01)  
C09B 67/00 (2006.01)  
C09B 67/04 (2006.01)  
C09B 67/10 (2006.01)  
C09B 67/14 (2006.01)  
C09B 67/22 (2006.01)  
C09B 67/48 (2006.01)  
C08K 5/34 (2006.01)  
C09D 7/12 (2006.01)  
C09D 11/00 (2006.01)  
C09D 11/02 (2006.01)  
C09D 17/00 (2006.01)  
C09D 201/00 (2006.01)  
D06P 1/00 (2006.01)  
D06P 1/642 (2006.01)  
G03G 5/06 (2006.01)  
G03G 9/09 (2006.01)

(52) U.S. Cl. ............... 106/498; 106/31.6; 106/31.77; 106/494; 252/8.57; 430/4; 430/108.15; 430/108.2; 430/108.21; 524/90

(58) Field of Classification Search ............... 106/31.6, 106/31.77, 498, 494; 430/4, 108.15, 108.2, 430/108.21; 524/90; 252/8.57  
See application file for complete search history.

(56) References Cited

U.S. PATENT DOCUMENTS

| | | | | |
|---|---|---|---|---|
| 4,556,622 A * | 12/1985 | Neumann et al. | ......... | 430/58.3 |
| 4,780,531 A | 10/1988 | Kano et al. | | |
| 5,141,837 A * | 8/1992 | Nguyen et al. | ............. | 430/135 |
| 6,268,097 B1 * | 7/2001 | Hayata et al. | ................ | 430/78 |
| 7,083,675 B2 * | 8/2006 | Mizuguchi et al. | .......... | 106/498 |
| 7,105,046 B2 * | 9/2006 | Mizuguchi et al. | .......... | 106/498 |

FOREIGN PATENT DOCUMENTS

| | | |
|---|---|---|
| CH | 373844 | 12/1963 |
| DE | 32 09 424 | 1/1983 |
| EP | 0 061 092 | 9/1982 |
| EP | 0 143 979 | 6/1985 |
| EP | 0 698 649 | 2/1996 |
| EP | 1 413 605 | 4/2004 |

(Continued)

Primary Examiner—Anthony J Green  
(74) Attorney, Agent, or Firm—Oblon, Spivak, McClelland, Maier & Neustadt, P.C.

(57) ABSTRACT

Black perylene pigments which comprise one of the isomers of the formula Ia or Ib

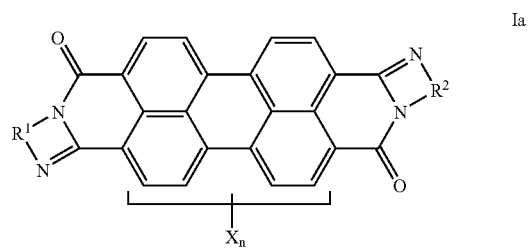

Ia

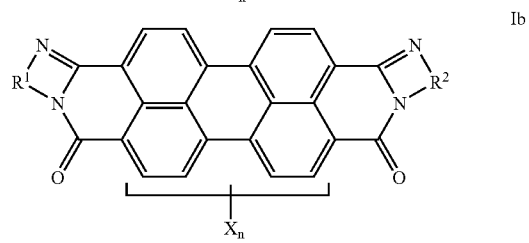

Ib in which  
$R^1$, $R^2$ are each independently phenylene, naphthylene or pyridylene, each of which may be mono- or polysubstituted by $C_1$-$C_{12}$-alkyl, $C_1$-$C_6$-alkoxy, hydroxyl, nitro, and/or halogen;  
X is halogen;  
n is from 0 to 4,  
or comprises a mixture of both isomers and has a blackness value $\geq 210$ in an alkyd/melamine baking varnish.

21 Claims, No Drawings

FOREIGN PATENT DOCUMENTS

| | | |
|---|---|---|
| EP | 1 413 606 | 4/2004 |
| GB | 972 485 | 10/1964 |
| JP | 07 157681 | 6/1995 |
| JP | 8-6277 A * | 1/1996 |
| JP | 11256061 | 9/1999 |
| JP | 200238047 A * | 2/2002 |
| WO | 03 010241 | 2/2003 |
| WO | 03 010242 | 2/2003 |

* cited by examiner

BLACK PERYLENE PIGMENTS

The present invention relates to black perylene pigments which comprise one of the isomers of the formula Ia or Ib

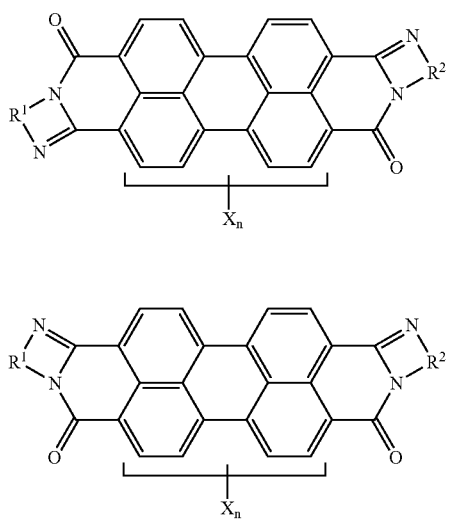

in which
R$^1$, R$^2$ are each independently phenylene, naphthylene or pyridylene, each of which may be mono- or polysubstituted by C$_1$-C$_{12}$-alkyl, C$_1$-C$_6$-alkoxy, hydroxyl, nitro, and/or halogen;
X is halogen;
n is from 0 to 4, or comprises a mixture of both isomers and has a blackness value ≧210 in an alkyd/melamine baking varnish.

In addition, the invention relates to the preparation of the perylene pigments and to their use for coloring high molecular weight organic and inorganic materials of natural and synthetic origin, especially coatings, inks including printing inks, toners, polymers, paints, plastics articles, glasses, silicatic layer systems and organic-inorganic composites, and also leather and leather-like materials, as a charge-generating material for electrophotography and as a constituent of the black matrix in LC displays, and also for preparing water-, polymer- or polymer wax-based pigment preparations.

Finally, the invention relates to pigment synergists of the formula Ia' and/or Ib'.

In order to color coatings, printing inks, plastics, glasses, leather or else other materials black, it is customary to use the black pigments carbon black, aniline black, iron oxide black and chromium oxide black or trichromic colorant mixtures.

The aforementioned pigmentary colorants absorb light having wavelengths from the ultraviolet as far as into the far infrared region, i.e. also the solar infrared and heat radiation. Materials which are colored using these black pigments are therefore heated very markedly under direct solar irradiation. When these conventional black pigments are used as colorants in coatings for electronic components, as used in the black matrix in LC displays, they additionally import to this coating a certain inherent electrical conductivity which adversely affects the functioning of the electronic components.

Although the trichromic colorant mixtures have neither the unfavorable absorption in the infrared nor high electrical conductivities, they tend, as low molecular weight compounds, to migrate in the application medium and exhibit low compatibility with many matrix materials (for example common polyolefins or water-based coatings), so that their possible uses are highly restricted.

In the last few years, the demand for black colorants, especially black pigments, which do not have the unfavorable properties mentioned has risen greatly for many fields of application.

Examples include black coatings having high electrical resistance for electronic components, black paint systems and coatings for the automotive and building sector which heat only slightly, if at all, under solar irradiation, mulch and protective films having low intrinsic heating for agriculture, optical filters and IR-transparent active components for security printing and copy protection systems.

A further application of interest is that of laser penetration welding of plastics parts and films. Plastics parts which are colored with the conventional black pigments cannot be used for this purpose, since the incident laser light whose wavelength is normally in the NIR range (for example at 808, 940 or 1064 nm) is already absorbed completely by these pigments at the surface of the workpiece to be penetrated, the lower-lying bonding region to the workpiece beneath is thus not reached at all and, as a consequence, the melting operation required to create a mechanically stable bond can no longer be induced in this zone.

In the meantime, black pigments based on perylene (C.I. Pigment Black 31 and 32 (N,N'-diphenylethyleneperylene-3, 4:9,10-tetracarboximide and N,N'-di(p-methoxytolyl)-perylene-3,4:9,10-tetracarboximide respectively)) have become available and are NIR-transparent but their absorption band is at from about 650 to 700 nm, so that they do not absorb within the entire visible spectral region. These pigments do not therefore have a neutral black appearance, but rather have an undesired greenish tinge, especially in a white reduction. In addition, they have increased solubility and inadequate thermal stability in many application media, which greatly limits their usefulness, in particular in the coloring of plastics.

WO-A-03/10241 and 03/10242 describe perylene pigments of the formula Ib defined at the outset and also mixtures of pigments of the formulae Ia and Ib (R$^1$, R$^2$=phenylene; n=0), whose physical properties, however, differ from those of the inventive pigments. For instance, the pigments prepared by dry calcining only have insufficient blackness (i.e., blackness values ≦200), which is why the black full shade colorations obtained with them have a distinct greenish or brownish tinge. In addition, these pigments are very resistant to dispersion, i.e. can only be distributed in the application medium under high energy input and only incompletely, which adversely affects the transparency and homogeneity of the resulting colorations.

It is accordingly an object of the invention to remedy the disadvantages mentioned and provide NIR-transparent black pigments of high blackness with advantageous performance properties.

Accordingly, black perylene pigments have been found which comprise one of the isomers of the formula Ia or Ib

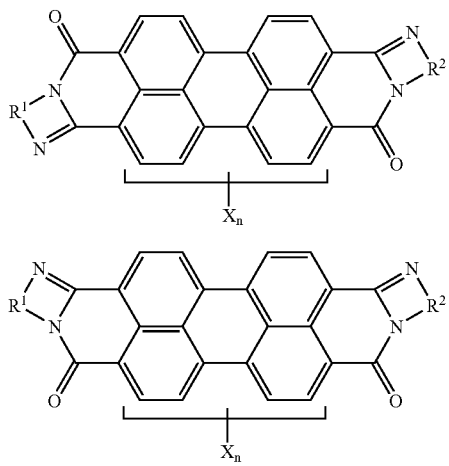

in which the variables have the following meaning:
R$^1$, R$^2$ are each independently 1,2-phenylene, 1,8-, 1,2- or 2,3-naphthylene or 2,3- or 3,4-pyridylene, each of which may be mono- or polysubstituted by C$_1$-C$_{12}$-alkyl, C$_1$-C$_6$-alkoxy, hydroxyl, nitro and/or halogen and are in particular both phenylene or naphthylene, each of which is preferably substituted;

X is halogen, in particular chlorine or bromine;

n is from 0 to 4, or comprise a mixture of both isomers and have a blackness value ≧210 in an alkyd/melamine baking varnish.

The term "mixture" is intended to include both physical mixtures and preferably solid solutions (mixed crystals) of the compounds Ia and Ib.

The phenylene, naphthylene and pyridylene radicals R$^1$ and R$^2$ in the formulae Ia and Ib may be mono- or polysubstituted by C$_1$-C$_{12}$-alkyl, especially C$_1$-C$_4$-alkyl, C$_1$-C$_6$-alkoxy, in particular C$_1$-C$_4$-alkoxy, hydroxyl, nitro and/or halogen, especially chlorine or bromine.

However, preference is given to the phenylene, naphthylene and pyridylene radicals being unsubstituted, preference being given to the phenylene and naphthylene radicals and particular preference to the naphthylene radicals.

The inventive perylene pigments absorb within the entire visible spectral region and are notable for their high blackness, i.e. for a blackness value ≧210, preferably ≧230, in an alkyd/melamine baking varnish. Accordingly, they result in deep black, neutral full shade colorations. In a white reduction, neutral gray hues (for example perylene pigments Ia/Ib where R$^1$=R$^2$=naphthylene) with slight to distinct blueish colorations (for example perylene pigments Ia/Ib where R$^1$=R$^2$=phenylene). It is of course possible to shade the colorations in a customary manner by using small amounts of inorganic or organic pigments which can be added during the pigment finishing, as early as in the course of pigment synthesis or not until the perylene pigment has been formed.

The inventive perylene pigments are transparent in the NIR region; the transmission is accordingly generally >80%.

They generally have a primary particle size of ≦800 nm, preferably ≦500 nm, more preferably ≦200 nm, and are readily dispersed, i.e. they have, for example, a dispersion hardness DH<5 to DIN 53775, sheet 7 in the course of plastics coloration.

They may advantageously be prepared by the process which is likewise in accordance with the invention, which comprises subjecting the crude pigments obtained in the synthesis a) to a comminution and, if desired, to a recrystallization in a liquid medium or b) to a comminution with simultaneous recrystallization.

The crude pigments used in the preparation of the inventive perylene pigments can be prepared in a commonly known manner by condensing perylene-3,4:9,10-tetra-carboxylic acid/dianhydride with the appropriate aromatic diamine at elevated temperature (for example from 150 to 250° C.) in a high-boiling organic solvent such as nitrobenzene, tri- and dichlorobenzene, α-chloronaphthalene, quinoline, tetralin, N-methylpyrrolidone, N,N-dimethylformamide, ethylene glycol, glacial acetic acid and cyclic urea derivatives, or in water (cf., for example, CH 373 844, GB 972 485, JP-A-07-157 681).

The reaction is effected in two steps. In the first step, only one of the two amino groups reacts to give the corresponding diimide; the ring closure in the second reaction step proceeds after prolonged heating and can be accelerated by adding a catalyst such as zinc chloride, zinc acetate, zinc oxide, acetic acid, hydrochloric acid, p-toluenesulfonic acid or an amine, for example piperazine.

Particularly advantageously, the crude pigments used in the pigment formation may be obtained by the process which is likewise in accordance with the invention, by condensing perylene-3,4:9,10-tetracarboxylic dianhydride with an aromatic ortho-diamine which has the arylene radical R$^1$ or R$^2$ and, if desired, X radicals (i.e., for example, 1,2-phenylene, 1,2-, 2,3- and 1,8-naphthylene), and subsequently cyclizing, which comprises carrying out condensation and cyclization in phenol or nitrogen-containing, nonfused heteroaromatic as a reaction medium.

Suitable nitrogen-containing, nonfused heteroaromatics are in particular those hetero-aromatics which contain only nitrogen atoms as heteroatoms, but it is also possible to use those heteroaromatics which, in addition to nitrogen atoms, contain oxygen or sulfur atoms, such as oxazole, isoxazole, thiazole and isothiazole.

Examples of preferred heteroaromatics are pyridine, pyrrole, pyrazole, imidazole, 1,2,4- and 1,2,3-triazole and tetrazole. In the heteroaromatics which contain more than one nitrogen atom, the hydrogen atom on the N—H function may be replaced, for example, by a saturated or unsaturated, aliphatic or cycloaliphatic radical, in particular a C$_1$-C$_6$-alkyl radical. In addition, the carbon atoms present in the rings may also be substituted by these radicals, halogen atoms or nitro groups. Examples of particularly suitable compounds are 1-methyl- and 1-ethylimidazole.

Particularly preferred heteroaromatics are imidazole and 1-methylimidazole.

It will be appreciated that it is also possible to use mixtures of the nitrogen-containing, nonfused heteroaromatics as the reaction medium.

Condensation and in particular also cyclization proceed in these reaction media substantially more readily than in the solvents used in the existing processes, so that reaction temperatures in the range from 130 to 195° C., in particular from 150 to 190° C., can be selected without having to accept prolonged reaction times. For instance, typical reaction times for the process according to the invention are from about 3 to 8 h.

In general, from 1.5 to 10 g, preferably from 2 to 5 g, of phenol or nitrogen-containing, nonfused heteroaromatic per g of perylene pigment are used.

The molar ratio of the aromatic diamine and perylene-3,4: 9,10-tetracarboxylic dianhydride reactants is generally from 2:1 to 3:1, preferably from 2.1:1 to 2.4:1.

If desired, it is possible to add to the reaction mixture in the synthesis in phenol one of the abovementioned catalysts, of which preference is given to piperazine. Typical use amounts are then from 0.1 to 1.35 mol of catalyst per mole of product. In the case of the synthesis in a nitrogen-containing, nonfused heteroaromatic, the addition of a catalyst may advantageously be omitted.

In terms of the process, the procedure in the process according to the invention for preparing the crude perylene pigments in phenol is as follows:

A stirred phenol melt at from about 50 to 70° C. is initially charged, perylene-3,4:9,10-tetracarboxylic dianhydride, catalyst and aromatic diamine are added and the mixture is maintained at the desired reaction temperature in the preferred range from 140 to 190° C. for from 2 to 8 h. In the course of this, the water of reaction formed is distilled off as an azeotrope with phenol. To dilute the mixture, a lower aliphatic alcohol, for example methanol, is added after cooling to from about 60 to 130° C., and the mixture is stirred at from 40 to 65° C. for a further 1 to 2 h.

In the preparation of the perylene crude pigments in a heteroaromatic, the procedure is appropriately to initially charge perylene-3,4:9,10-tetracarboxylic dianhydride and aromatic diamine in the heteroaromatic, heat them to the desired reaction temperature of from 130 to 195° C., and remove the water of reaction formed from the reaction mixture, for example, by azeotropic separation.

The crude perylene pigment can subsequently be isolated in both cases as usual by filtering, washing and drying.

Depending on the $R^1$ and $R^2$ radical present and solvent used, the crude pigments obtained in the inventive synthesis and also in the known preparation processes occur in different form.

For instance, perylene pigments in which $R^1$ and $R^2$ are each phenylene and n=0 are generally obtained in the case of the inventive synthesis in phenol or a nitrogen-containing, nonfused heteroaromatic in the form of large crystals usually of very heterogeneous shape, or else as a semiamorphous powder.

However, perylene pigments in which $R^1$ and $R^2$ are each naphthylene and n=0 are generally obtained directly in the inventive synthesis in pigmentary form, i.e. in a crystal size of <1 µm.

In a particularly preferred embodiment for variant a) of the abovementioned process according to the invention for the preparation of the inventive perylene pigments, the crude pigments are initially subjected to a dry grinding in the presence or absence of a salt as a grinding assistant and then to a recrystallization in an organic solvent, if desired in a mixture with water, under hot conditions.

Suitable for the dry grinding are, for example, ball mills, vibration mills, planetary mills and attritors. Suitable grinding media are, for example, steel balls, silicon/aluminum/zirconium oxide beads, glass beads and agate balls which typically have a diameter in the range from 0.1 to 5 cm.

When the pigments are obtained in the synthesis in pigmentary form, a high-energy powder grinding, for example grinding in a jet mill, is usually sufficient for conversion to an industrially usable form, and the subsequent recrystallization can be omitted.

For safety reasons, it may be advantageous to carry out the grinding under an inert gas atmosphere.

The dry grinding may also be carried out in the form of a salt grinding. The grinding assistants used in this case are water-soluble inorganic salts which have at least a solubility of 10 g/100 ml of water. Preferred salts are, for example, aluminum sulfate, sodium sulfate, sodium carbonate, calcium chloride, potassium chloride and sodium chloride, with or without water of crystallization, particular preference being given to sodium sulfate, potassium chloride and sodium chloride. To remove the salt, the ground material is stirred in water, filtered off and washed.

If desired, the ground material obtained in the case of grinding with steel balls may be subjected to an aftertreatment with hydrochloric acid to remove any iron attritus present.

Preference is given to grinding until the ground material has an average primary particle size of <30 nm.

The liquid medium used for the subsequent recrystallization may be a multitude of organic solvents.

Suitable solvents are, for example, alcohols, ether alcohols, ethers, ketones, aliphatic carboxylic acids, carboxamides, carboxylic esters, hydrocarbons, and also the nitrogen-containing, nonfused heteroaromatics used in the likewise inventive process for preparing the crude pigments. It will be appreciated that mixtures of these solvents may also be used.

In addition to the abovementioned nitrogen-containing, nonfused heteroaromatics, specific examples of particularly suitable solvents are:

aliphatic and araliphatic, monohydric or polyhydric alcohols having up to 10 carbon atoms, such as methanol, ethanol, propanol, isopropanol, butanol, isobutanol, tert-butanol, amyl alcohol, isoamyl alcohol, hexanol, isohexanol, heptanol, octanol, 2-ethyl-hexanol, ethylene glycol, 1,2- and 1,3-propylene glycol, cyclohexanol, methylcyclo-hexanol, benzyl alcohol and 2-phenylethanol;

mono- and di-$C_2$-$C_3$-alkylene glycol mono-$C_1$-$C_4$-alkyl ethers, such as ethylene glycol monomethyl, monoethyl and monobutyl ether and diethylene glycol monomethyl and monoethyl ether;

acyclic and cyclic aliphatic ethers having up to 10 carbon atoms, such as dipropyl ether, diisopropyl ether, dibutyl ether, diisobutyl ether, tetrahydrofuran, dioxane, diethylene glycol dimethyl ether and diethylene glycol diethyl ether;

acyclic and cyclic aliphatic and araliphatic ketones having up to 10 carbon atoms, such as acetone, methyl ethyl ketone, methyl propyl ketone, methyl butyl ketone, diethyl ketone, methyl isopropyl ketone, methyl isobutyl ketone, cyclopentanone, cyclo-hexanone, methylcyclohexanone, acetophenone and propiophenone;

aliphatic carboxylic acids having up to 4 carbon atoms, such as formic acid, acetic acid, propionic acid and butyric acid;

amides and $C_1$-$C_4$-alkylamides of aliphatic carboxylic acids having up to 4 carbon atoms, such as formamide, N,N-dimethyl- and N,N-diethylformamide, N,N-dimethyl- and N,N-diethylacetamide, N,N-dimethyl- and N,N-diethylpropionamide and N-methylpyrrolidone;

esters of aromatic carboxylic acids having a total of up to 12 carbon atoms, such as dimethyl phthalate and diethyl phthalate;

alicyclic and aromatic hydrocarbons, such as cyclohexane, benzene, toluene, xylene (all isomers), mesitylene (all isomers), ethylbenzene, chlorobenzene, o-dichlorobenzene, trichlorobenzene, nitrobenzene, phenol, naphthalene, methyl-naphthalene, dimethylnaphthalene, tetrahydronaphthalene, decahydronaphthalene and quinoline.

For the recrystallization, preference is given to using those solvents which can be readily removed in the workup, for example by washing with water, if appropriate with addition of acid, azeotropic distillation with water, steam distillation or by drying the entire batch (for example by distilling off the solvent).

Particular preference is given to using those solvents which have a boiling point of ≦150° C. and can be evaporated without decomposition or residue, for example $C_1$-$C_5$-alkanols, ketones such as methyl ethyl ketone, ethers such as tetrahydrofuran and dioxane, and hydrocarbons such as cyclohexane, benzene, toluene, xylene and chloro-benzene, and mixtures thereof, of which very particular preference is given to xylene and toluene.

Further particularly preferred examples of recrystallizing solvents are the nitrogen-containing, nonfused heteroaromatics used for the pigment synthesis.

Very particular preference is given to mixtures of organic solvent and water.

The amount of solvent is generally uncritical and can be varied within wide limits. In general, from 3 to 20 g, preferably from 4 to 15 g, of solvent are used per g of ground material.

Typically, the recrystallization is undertaken at a temperature of from 25 to 260° C., in particular from 60 to 180° C.

The recrystallization can be effected with dispersion of the ground material in the solvent or else by simply allowing the ground material to remain in the solvent. Preference is given to stirring the mixture of ground material and solvent.

The duration of the recrystallization depends upon the temperature and the solvent. In general, it is complete within from 1 to 24 h.

In a particularly preferred embodiment for variant b) of the abovementioned inventive preparation process, the crude pigments are subjected to kneading under hot conditions in the presence of an organic solid having recrystallizing action and of an inorganic salt.

The kneading is preferably carried out in common double-shaft kneaders, but it is also possible to use single-shaft kneaders, mixers or extruders. It is likewise possible to mull in an edge mill.

Suitable inorganic salts are the water-soluble salts mentioned above for the dry salt grinding, in particular, for example, sodium chloride and sodium sulfate. Typically, technical-grade salts with or without preceding micronization are used. The salts preferably have an average particle size of from 5 to 200 µm, more preferably from 10 to 50 µm. In addition, they appropriately only have a solubility of ≦100 mg/l, in particular ≦10 mg/l (in each case at 20° C.), in the organic solvent; they are preferably virtually insoluble therein.

The organic solvent used in the kneading preferably also has a solubility in water of at least 10 g/100 ml and can be neutral, but also acidic or basic. In addition to the classes of solvent listed for the recrystallization in the first process variant, sulfones and sulfoxides are also suitable as solvents for the kneading. It will be appreciated that it is also possible here to use solvent mixtures.

Specific examples of particularly suitable solvents are:

ethylene glycol, diethylene glycol, triethylene glycol, dipropylene glycol, ethylene glycol monobutyl ether, methyl ethyl ketone, cyclohexanone, diacetone alcohol, dimethylformamide, dimethylacetamide, N-methylpyrrolidone, butyl acetate, glycerol triacetate, sulfolane and dimethyl sulfoxide.

In general, the kneading mass contains, per g of crude pigment, from 0.5 to 2 g, preferably from 0.6 to 1 g, of organic solvent, and from 1 to 10 g, in particular from 3 to 8 g, of inorganic salt.

The kneading temperature is generally from 20 to 180° C., preferably from 80 to 150° C.

The rotation rate is appropriately selected in such a way that the kneading mass is moved homogeneously and with uniform shear.

The kneading time is typically from 0.5 to 24 h, in particular from 1 to 8 h.

The inorganic salt and the organic solvent may be washed out with water after the kneading.

In a further embodiment for variant b) of the abovementioned inventive preparation process, the crude pigments are subjected to a wet grinding in the presence of an organic solvent having recrystallizing action, if desired in a mixture with water.

The wet grinding may advantageously be undertaken in a stirred ball mill.

Suitable organic solvents are in principle the solvents mentioned for variant a), and preference is given to water-soluble solvents.

Preference is given to carrying out the wet grinding in an aqueous medium. The amount of water and solvent are advantageously selected in such a way that the pigment content in the ground paste is from 20 to 50% by weight. The solvent content is typically from 1 to 50% by weight based on the crude pigment.

The grinding temperature is generally from 5 to 100° C., preferably from 10 to 85° C.

The inventive perylene pigments may advantageously also be prepared by the further process according to the invention, which comprises subjecting the crude pigments obtained in the synthesis, if desired after a comminution, to a swelling in a concentrated acid.

To this end, the crude pigment is typically stirred at a certain temperature for a certain time in the concentrated acid. The mixture is subsequently added to water, then the precipitated pigment is filtered off, washed, dried and pulverized.

Examples of suitable acids are, in addition to organic acids such as trifluoroacetic acid, in particular concentrated inorganic acids such as polyphosphoric acid and in particular sulfuric acid.

The acid used generally has a concentration of from 50 to 90% by weight, preferably from 70 to 85% by weight.

Typically, pigment concentration is from 5 to 20% by weight, in particular from 7 to 15% by weight.

The swelling is generally carried out at from 20 to 100° C., preferably from 30 to 60° C., and is generally complete within from 1 to 24 h, in particular within from 4 to 12 h.

To control the crystal size, it may be advantageous to carry out the pigment finishing, i.e. the conversion of the crude pigments to the inventive perylene pigments, in the presence of pigment synergists, in which case typically from about 0.01 to 0.1 g of synergist per g of pigment is used. The pigment synergists may be added as early as in the precomminution step, or else not until the recrystallization step. The pigment synergists may also be added as early as in the course of pigment synthesis, so that influence is exerted here on the particle shape even at this early stage.

Finally, the perylene pigments may also only be mixed with the pigment synergists for the application.

Pigment synergists are compounds which contain some or all of the pigment chromophore in their molecular structure and preferably have acidic or basic groups. The structure of the pigment system does not have to coincide with the structure of the pigments whose crystallization is to be influenced. For instance, it is possible in the present case to use not only pigment synergists based on the perylene structure, but also, for example, those based on the copper phthalocyanine structure.

Particularly suitable pigment synergists which are likewise in accordance with the invention may be based on one or both isomers of the formula Ia' or Ib'

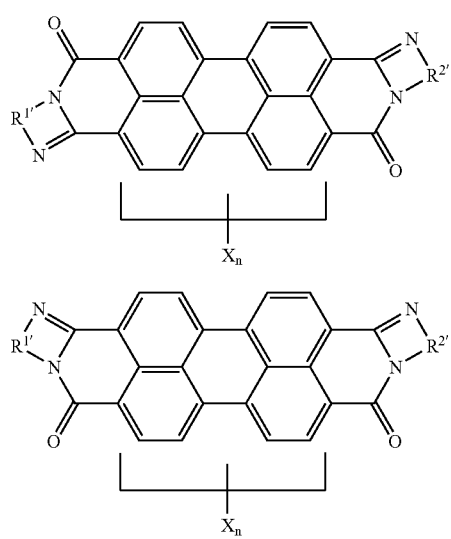

in which $R^{1'}$, $R^{2'}$, are each independently phenylene, naphthylene or pyridylene, each of which is mono- or polysubstituted by —COO⁻ M⁺, —COOR³, —CONR³R⁴, —COO⁻N⁺R³R⁴R⁵R⁶, —SO₂NR³R⁴, —CH₂NR³R⁴, —CH₂N⁺R³R⁴R⁵R⁶ R³—COO⁻ and/or —CH₂R⁷, and may additionally be mono- or polysubstituted by $C_1$-$C_{12}$-alkyl, $C_1$-$C_6$-alkoxy, hydroxyl, nitro and/or halogen;

$R^3$, $R^4$, $R^5$, $R^6$ are each independently hydrogen; $C_1$-$C_{12}$-alkyl or $C_2$-$C_{12}$-alkenyl whose hydrocarbon chain may in each case be interrupted by one or more —O—, —S—, —NR⁸—, —CO— or —SO₂— moieties, and/or be mono- or polysubstituted by hydroxyl, halogen, aryl, $C_1$-$C_4$-alkoxy and/or acetyl; $C_3$-$C_8$-cycloalkyl whose carbon skeleton may be interrupted by one or more —O—, —S—, —NR⁸— or —CO—moieties, and/or be substituted by acetyl;

$R^7$ is phthalimidyl;

$R^8$ is hydrogen or $C_1$-$C_8$-alkyl;

M⁺ is hydrogen or a metal cation, in particular as alkali metal cation, especially sodium or potassium;

X is halogen;

n is from 0 to 4.

Also suitable as pigment synergists are compounds of the formula Ia' and/or Ib' which are substituted on the $R^{1'}$ and $R^{2'}$ radicals by sulfonic acid groups which are present in the form of the salt. US-A-2004/0215015 describes the use of these compounds for liquid-crystalline systems.

The presence of pigment synergists often also has a positive effect on the dispersibility and the flocculation stability of the inventive perylene pigments in the application medium and thus also on the rheology of the application medium, for example of a paint system.

The dispersibility of the inventive perylene pigments may often additionally be improved by contacting the pigments with conventional additives which may be used at the points in the overall preparation process specified for the pigment synergists, or else not until the perylene pigment is used. In addition to additives based on rosin derivatives, additives based on natural and synthetic waxes are also especially suitable for coloring plastics. Examples include waxes based on polyethylene and on polypropylene which may also be oxidized, on polyethylene oxide, on ethoxylated fatty alcohols, on polyethylene oxide/polypropylene oxide block copolymers, on fatty acid esters (for example montan waxes), on fatty acid amides and on ethylene/vinyl acetate copolymers.

The inventive perylene pigments are outstandingly suitable for coloring high molecular weight organic and inorganic materials of natural and synthetic origin. Examples of high molecular weight synthetic organic materials include:

polyolefins such as polyethylene, polypropylene, polybutylene, polyisobutylene and poly-4-methyl-1-pentene, polyolefin copolymers such as Luflexen® (Basell), Nordel® (Dow) and Engage® (DuPont), cycloolefin copolymers such as Topas® (Celanese), polytetrafluoroethylene (PTFE), ethylene/tetrafluoroethylene copolymers (ETFE), polyvinylidene difluoride (PVDF), polyvinyl chloride (PVC), polyvinylidene chloride, polyvinyl alcohols, polyvinyl esters such as polyvinyl acetate, vinyl ester copolymers such as ethylene/vinyl acetate copolymers (EVA), polyvinyl alkanals such as polyvinyl acetal and polyvinyl butyral (PVB), polyvinyl ketals, polyamides such as Nylon® [6], nylon [12] and nylon [6,6] (DuPont), polyimides, polycarbonate, polycarbonate copolymers and physical blends of polycarbonates with acrylic-butadiene-styrene copolymers, acrylonitrile-styrene-acrylic ester copolymers, polymethyl methacrylates, polybutyl acrylates, polybutyl methacrylates, polybutylene terephthalates and polyethylene terephthalates, polyesters such as polyethylene terephthalate (PET), polybutylene terephthalate (PBT) and polyethylene naphthalate (PEN), copolymers, transesterification products and physical mixtures (blends) of the aforementioned polyalkylene terephthalates, poly(meth) acrylates, polyacrylamides, polyacrylonitrile, poly(meth) acrylate/polyvinylidene difluoride blends, polyurethanes, polystyrene, styrene copolymers such as styrene/butadiene copolymers, styrene/acrylonitrile copolymers (SAN), styrene/ethyl methacrylate copolymers, styrene/butadiene/ethyl acrylate copolymers, styrene/acrylonitrile/methacrylate copolymers, acrylonitrile/butadiene/styrene copolymers (ABS) and methacrylate/butadiene/styrene copolymers (MBS), polyethers such as polyphenylene oxide, polyether ketones, polysulfones, polyether sulfones, polyglycols such as polyoxymethylene (POM), polyaryls such as polyphenylene, polyarylenevinylenes, silicones, ionomers, thermoplastic and thermoset polyurethanes and mixtures thereof.

High molecular weight organic materials which can be colored include not only the polymers themselves ("plastics") which may be present in the form of powder, plastic masses, melts or in the form of spinning solutions, but also the coatings, printing inks and paints which comprise these materials in dissolved or dispersed form.

The inventive perylene pigments can be incorporated into the plastics by all known methods, for example by coextrusion (preferably using a single- or twin-screw extruder), rolls, kneaders, presses or mills, and the plastics may be processed to give plastics moldings, endless profiles, slabs, foils, fibers, films and coatings.

Examples of high molecular weight synthetic inorganic materials include:

low-melting borosilicate glass frits, organically modified or unmodified silicate sols and gels, doped or undoped silicate, aluminate, zirconate and aluminosilicate coatings prepared via a sol-gel process, and sheet silicates.

Examples of natural materials colorable with the inventive perylene pigments include leather, for example shoe leather, apparel leather and upholstery leather. It will be appreciated that it is also possible to color leatherlike materials of synthetic origin.

Some selected fields of application of particular interest for the inventive perylene pigments are mentioned by way of example hereinbelow.

A field of interest is the use in security printing inks, for example production and printing of banknotes, share certificates, checks, credit cards, stamps, lottery tickets and forgery-proof packagings, for example for pharmaceutical products and high-value branded articles.

Particularly suitable for this purpose are the inventive perylene pigments of the formula Ia and/or Ib in which $R^1$ and $R^2$ are each phenylene and n=0, since these pigments have a marked absorption in the visible region from 400 to 800 nm and are transparent in the NIR region (band edge about 750 nm). Likewise very suitable are the inventive perylene pigments of the formula Ia and/or Ib in which $R^1$ and $R^2$ are each naphthylene and n=0, which likewise absorb strongly in the visible region and are transparent in the NIR region (band edge approx. 950 nm).

The black prints produced with these pigments are transparent when viewed in NIR light, i.e. they become invisible. It is thus possible, for example, to overprint a motif printed with a customary carbon black pigment with the IR-transparent printing ink. When viewed in NIR light, the original motif becomes visible again.

The inventive perylene pigments can be incorporated into the binder systems of these security printing inks, like any printing ink, using customary dispersion units, for example stirred ball mills or roll mills. It is also possible to employ all known printing processes, for example offset printing, gravure printing, relief printing, intaglio printing, screen printing and pad printing.

Moreover, the inventive perylene pigments may also be used advantageously in varnishes and laminates in order to achieve better heat protection in the case of black and gray paint systems or film coatings, and also in the case of paint systems or film coatings which comprise black pigments as a color mixture component. It has to be ensured that the IR radiation is reflected either by the varnish layer or laminated film itself or by its background, which is achieved by adding extraneous particles having a high level of scattering in the IR region, such as titanium dioxide pigments and inorganic mixed phase pigments (for example Sicotan® pigments, BASF), or extraneous particles having a high level of reflection in the IR region, such as aluminum flakes and luster pigments, for example those based on coated aluminum platelets, to the varnish or to the lamination film, or using metallic backgrounds or white backgrounds having diffuse scattering.

In addition, the inventive perylene pigments, especially the preferred perylene pigments ($R^1$, $R^2$: phenylene or naphthylene), may advantageously be used as a constituent of the black matrix in LC displays owing to their very low electrical conductivity. In these color filters, the red, green and blue color fields are separated by a black grid, known as the black matrix. To this end, resist inks are produced using the inventive perylene pigments and, after application and curing with UV light, result in a black matrix having the desired high resistance value of $>10^{13}\Omega$ and high optical density at low layer thickness.

The inventive perylene pigments may also be used advantageously in the field of electrophotography, for example as black pigments for toners or as charge-generating materials.

Finally, owing to their NIR transparency, the inventive perylene pigments may also be used in an outstanding manner for the black coloration of plastics which are to be fused by the laser transmission method. In this context, they are especially notable for their thermostability and migration fastness compared to the trichromic dye mixtures customarily used. The perylene pigments of the formula Ia and/or Ib in which $R^1$ and $R^2$ are each phenylene may be used advantageously in combination with all common lasers (diode lasers: emission at 808 or 940 nm and solid-state lasers: emission at 1064 nm), while the perylene pigments of the formula Ia and/or Ib in which $R^1$ and $R^2$ are each naphthylene, owing to their NIR transparency shifted toward longer wave-lengths, can be used especially in combination with solid-state lasers.

For many applications, it may be advantageous to initially prepare liquid, water-based preparations of the inventive perylene pigments, which comprise water or mixtures of water and organic solvents as the liquid phase.

It is likewise advantageous to use pigment preparations, prepared separately beforehand, based on a polymer or a polymer blend, on one or more polyolefin waxes or on mixtures thereof to achieve homogeneous, strong colorations in low-melting polymers (for example most common polyolefins) or those having low melt viscosity (for example plasticized PVC and PVB, and also blow-moldable PET). While the carrier polymer (blend) used in the polymer-based pigment preparations ("masterbatch", "compound") is generally identical to the high molecular weight synthetic organic material to be colored, the carrier materials used to prepare polyolefin wax-based pigment preparations are in particular homo- and copolymeric PE and PP waxes such as Luwax® A (ethylene homopolymer; BASF), Luwax EVA (ethylene-vinyl acetate copolymer; BASF) or Licowax® PP 230 (propylene homopolymer; Clariant).

EXAMPLES

Preparation and Testing of Inventive Perylene Pigments

A) Preparation

Example 1

Perylene pigment II: cis/trans-isomer mixture of the formula Ia/Ib ($R^1$=$R^2$=1,2-phenylene; n=0)

a) Preparation of the Crude Pigment 78.4 g of perylene-3,4:9,10-tetracarboxylic dianhydride, 16.3 g of piperazine and 51.9 g of o-phenylenediamine were introduced into a stirred melt of 318 g of phenol at 70° C. After the mixture had been heated to 180° C., the mixture was stirred at this temperature for 8 h. The water of reaction formed was distilled off as an azeotrope with phenol.

After cooling to 130° C., slowly adding 350 g of methanol dropwise and stirring at 60° C. for a further hour, the reaction product was filtered off, washed with methanol until a clear filtrate was formed, dried at 100° C. under reduced pressure and then pulverized.

106 g of a black powder which was in the form of needle-like crystals of a size up to above 10 μm were obtained, which corresponds to a yield of 99%.

b) Pigment Finishing 50 g of the black powder obtained in step a) were ground in a 1.3 l vibration mill charged with 2.6 kg of steel balls (diameter 25 mm) for 10 h.

After removing the grinding balls, the ground material was then stirred in a mixture of 250 g of toluene and 250 g of water in an autoclave at 150° C. for 5 h. After distilling off the toluene azeotropically, the product was filtered off, washed with water and dried at 100° C. in a forced-air drying cabinet and then pulverized.

The resulting crystalline black perylene pigment II had a primary particle size in the range from 40 to 300 nm.

Example 2

Perylene pigment III: cis/trans-isomer mixture of the formula Ia/Ib ($R^1=R^2=$1,8-naphthylene; n=0)

a) Preparation of the Crude Pigment 78.4 g of perylene-3,4:9,10-tetracarboxylic dianhydride, 16.3 g of piperazine and 75.9 g of 1,8-diaminonaphthalene were introduced into a stirred melt of 265 g of phenol at 70° C. After the mixture had been heated to 180° C., the mixture was stirred at this temperature for 8 h. The water of reaction formed was distilled off as an azeotrope with phenol.

After cooling to 130° C., slowly adding 350 g of methanol dropwise and stirring at 60° C. for a further hour, the reaction product was filtered off, washed with methanol until a clear filtrate was formed, dried at 100° C. under reduced pressure and then pulverized.

125 g of a black powder which was in the form of needle-like crystals of a size of from 90 to 300 nm were obtained, which corresponds to a yield of 98%.

b) Pigment Finishing 50 g of the black powder obtained in step a) were ground in a 1.3 l vibration mill charged with 2.6 kg of steel balls (diameter 25 mm) for 10 h.

After removing the grinding balls, the ground material was then stirred in a mixture of 700 g of xylene in an autoclave at 180° C. for 5 h. After the toluene had been distilled off azeotropically, the product was filtered off, washed with water, dried at 100° C. in a forced-air drying cabinet and then pulverized.

The resulting crystalline black perylene pigment III had a primary particle size in the range from 30 to 150 nm.

Example 3

Perylene Pigment III a) Preparation of the Crude Pigment

The preparation was as described in Example 2a).

b) Pigment Finishing 50 g of the black powder obtained in step a) were ground in a 1.3 l vibration mill charged with 2.6 kg of steel balls (diameter 25 mm) for 10 h.

After removing the grinding balls, the ground material was then stirred in a mixture of 200 g of phenol in an autoclave at 180° C. for 8 h. After cooling to 120° C., adding 450 ml of methanol dropwise and stirring at 60° C. for a further 2 hours, the product was filtered off, washed with 300 ml of methanol, dried at 100° C. in a forced-air drying cabinet and then pulverized.

The resulting black perylene pigment III present in the form of uniform crystals had a primary particle size in the range from 20 to 80 nm.

Example 4

Perylene Pigment II a) Preparation of the Crude Pigment

The preparation was as described in Example 1a).

b) Pigment Finishing 12 g of the black powder obtained in step a) were ground with 90 g of sodium chloride in a 1.3 l vibration mill charged with 2.6 kg of steel balls (diameter 25 mm) at room temperature for 24 h.

After the grinding balls had been removed, the ground material was introduced in portions into a mixture of 1000 g of water and 200 g of conc. hydrochloric acid and stirred at room temperature for 1 h. Afterward, the black powder was filtered off and washed with water to free it of salts.

Several batches were carried out and then mixed.

172 g of the resulting water-moist presscake (dry content 29%) were then stirred in a mixture of 250 g of toluene and 128 g of water in an autoclave at 150° C. for 5 h. After the toluene had been distilled off azeotropically, the product was filtered off, washed with water, dried at 100° C. in a forced-air drying cabinet and then pulverized.

The resulting crystalline black perylene pigment II had a primary particle size in the range from 40 to 300 nm.

Example 5

Perylene Pigment III a) Preparation of the Crude Pigment

The preparation was as described in Example 2a).

b) Pigment Finishing 50 g of the black powder obtained in step a) were ground in a 1.3 l vibration mill charged with 2.6 kg of steel balls (diameter 25 mm) for 10 h.

After the grinding balls had been removed, 40 g of the resulting ground material were added rapidly to 305 g of 80% by weight sulfuric acid and stirred at 25° C. for 24 h. Subsequently, the mixture was precipitated in 1700 ml of water. The product was filtered off and suspended in 1000 ml of water.

The suspension was then adjusted to a pH of 9.8 using 5.9 g of 10% by weight sodium hydroxide solution. After stirring for 15 minutes, adding 40 g of a 10% by weight solution of a polymerized rosin (Dertopol®, Willers, Engel & Co.) in 1.5% by weight sodium hydroxide solution and stirring for a further 15 minutes, a pH of 2.9 was established using 10% by weight hydrochloric acid. The product was then filtered off, washed with water to free it of salts, dried at 55° C. in a forced-air drying cabinet and then pulverized.

The resulting black perylene pigment III present in the form of heterogeneous crystals had a primary particle size in the range from 50 to 600 nm.

Example 6

Perylene Pigment II a) Preparation of the Crude Pigment

The preparation was as described in Example 1a).

b) Pigment Finishing 35 g of the black powder obtained in step a) were kneaded with 210 g of sodium chloride and 40 g of dipropylene glycol in a double-shaft kneader (Duplex from IKA) having a kneading capacity of 0.3 l at 100° C. for 4 h.

The kneaded mass was introduced into 10 l of water and stirred for 30 min. The product was then filtered off, washed with water to free it of salts, dried at 100° C. in a forced-air drying cabinet and then pulverized.

The resulting black perylene pigment II present in the form of homogeneous crystals had a primary particle size in the range from 30 to 150 nm.

Example 7

Perylene Pigment III a) Preparation of the Crude Pigment

The preparation was as described in Example 2a).

b) Pigment Finishing 35 g of the black powder obtained in step a) were kneaded with 210 g of sodium chloride and 40 g of dipropylene glycol in a double-shaft kneader (Duplex from IKA) having a kneading capacity of 0.3 l at 100° C. for 4 h.

The kneaded mass was introduced into 10 l of water and stirred for 30 min. After establishing a pH of 11.2 using 10% by weight sodium hydroxide solution, the suspension was then admixed with 35 g of a 10% by weight solution of a polymerized rosin-based resin (Dertopol, Willers, Engel & Co.) in 1.5% by weight sodium hydroxide solution and, after a further stirring time of 15 min, was adjusted to a pH of 2.5 using 10% by weight hydrochloric acid. After stirring for a further 20 minutes, the product was filtered off, washed with water to free it of salts, dried at 100° C. in a forced-air drying cabinet and then pulverized.

The resulting black perylene pigment III present in the form of homogeneous crystals had a primary particle size in the range from 30 to 100 nm.

Example 8

Perylene Pigment II a) Preparation of the Crude Pigment

The preparation was as described in Example 1a).

b) Pigment Finishing 50 g of the black powder obtained in step a) were ground in a 1.3 l vibration mill charged with 2.6 kg of steel balls (diameter 25 mm) for 24 h.

After the grinding balls had been removed, 40 g of the resulting ground material were added rapidly to 400 g of 80% by weight sulfuric acid and stirred at 50° C. for 24 h. Subsequently, the mixture was precipitated in 2 l of water. The product was filtered off, washed to neutrality with water and then redispersed in 1 l of water.

After a pH of 9.8 had been established using 10% by weight sodium hydroxide solution, the suspension was then admixed with 40 g of a 10% by weight solution of a rosin-based polymerized resin (Dertopol, Willers, Engel & Co) in 1.5% by weight sodium hydroxide solution and, after a further stirring time of 15 min, adjusted to a pH of 2.5 using 10% by weight hydrochloric acid. After stirring for a further 20 minutes, the product was filtered off, washed with water to free it of salts, dried at 100° C. in a forced-air drying cabinet and then pulverized.

The resulting black perylene pigment II present in the form of heterogeneous crystals had a primary particle size in the range from 30 to 150 nm.

Example 9

Perylene Pigment III a) Preparation of the Crude Perylene Pigment

The preparation was as described in example 2a).

b) Pigment Finishing 50 g of the black powder obtained in step a) were ground in a 1.3 l vibration mill charged with 2.6 kg of steel balls (diameter 25 mm) for 10 h.

After removing the grinding balls, 40 g of the ground material were then stirred in 240 g of quinoline at 240° C. for 5 h. After cooling to 130° C., the mixture was diluted by cautiously adding 250 g of methanol dropwise. After stirring for a further 30 minutes, the product was filtered off, washed with 1000 ml of methanol, dried in a vacuum drying cabinet and then pulverized.

The resulting crystalline black perylene pigment III had a primary particle size in the range from 50 to 200 nm.

Example 10

Perylene Pigment III a) Preparation of the Crude Perylene Pigment

The preparation was as described in example 2a).

b) Pigment Finishing 50 g of the black powder obtained in step a) were ground in a 1.3 l vibration mill charged with 2.6 kg of steel balls (diameter 25 mm) for 10 h.

After removing the grinding balls, 40 g of the ground material were then stirred in 220 g of dimethylnaphthalene at 240° C. for 8 h. After cooling to 130° C., the mixture was diluted by cautiously adding 200 g of methanol dropwise. After stirring for a further 30 minutes, the product was filtered off, washed with 1000 ml of methanol and then suspended at 60° C. in 300 ml of water.

The suspension was then adjusted to a pH of 10.1 using 0.5 g of 10% by weight sodium hydroxide solution. After stirring for 5 minutes, adding 40 g of a 10% by weight solution of a polymerized rosin (Dertopol®, Willers, Engel & Co.) in 1.5% by weight sodium hydroxide solution and stirring for a further 15 minutes, a pH of 3.2 was established using 10% by weight hydrochloric acid. The product was then filtered off, washed with water to free it of salts, dried at 55° C. in a forced-air drying cabinet and then pulverized.

The resulting crystalline black perylene pigment III had a primary particle size in the range of from 50 to 200 nm.

Example 11

Perylene Pigment III a) Preparation of the Crude Perylene Pigment

The preparation was as described in example 2a).

b) Pigment Finishing

The crude perylene pigment was ground on a laboratory jet mill with a throughput of 8 kg/h and a grinding pressure of 8 bar at an injection pressure of 9 bar.

The resulting black perylene pigment III obtained in the form of heterogeneous crystals had a primary particle size in the range from 80 to 250 nm.

Example 12

Perylene Pigment II in a Mixture with C.I. Pigment Yellow 185 a) Preparation of the Crude Perylene Pigment

The preparation was as described in Example 1a).

b) Pigment Finishing

A mixture of 41.7 g of the black powder obtained in step a) and 8.3 g of C.I. Pigment Yellow 185 was ground in a 1.3 l vibration mill charged with 2.6 kg of steel balls (diameter 25 mm) for 20 h.

After the grinding balls had been removed, 40 g of the resulting ground material were heated to reflux for 3 h with stirring in 240 g of xylene. After the xylene had been distilled off azeotropically, the product was dried at 100° C. and then pulverized.

The resulting black powder was predominantly in the form of crystals having a primary particle size of from 40 to 400 nm.

Example 13

Perylene Pigment II a) Preparation of the Crude Perylene Pigment

A mixture of 78.4 g of perylene-3,4:9,10-tetracarboxylic dianhydride and 45.4 g of o-phenylenediamine in 350 g of N-methylimidazole was heated to 180° C. with stirring and stirred at this temperature for 6 h. Once an internal temperature of about 170° C. had been attained, the distilling-off of the water of reaction set in.

After cooling to 130° C., slowly adding 350 g of methanol dropwise and stirring at 65° C. for a further 1 hour, the reaction product was filtered off, washed first with 800 g of methanol, then with 500 ml of 5% by weight acetic acid and finally with 1.5 l of water, dried at 100° C. in a forced-air drying cabinet and then pulverized.

106.5 g of a black powder whose primary crystals have a size of several μm were obtained, which corresponds to a yield of 99.4%.

b) Pigment Finishing 50 g of the black powder obtained in step a) were ground in a 1.3 l vibration mill charged with 2.6 kg of steel balls (diameter 25 mm).

After the grinding balls had been removed, 40 g of the ground material was stirred in 200 g of N-methylimidazole at 180° C. for 5 h. After cooling to room temperature, the product was filtered off and washed first with 1000 ml of 5% by weight acetic acid and then to neutrality with water, dried at 100° C. in a force-air drying cabinet and then pulverized.

The resulting crystalline black perylene pigment II had a primary particle size in the range from 50 to 200 nm.

Example 14

Perylene Pigment II

Preparation of the Crude Pigment

The procedure was analogous to example 13a), except that 300 g of imidazole were used instead of N-methylimidazole.

105 g of a black powder whose primary crystals have a size of several μm were obtained, which corresponds to a yield of 98%.

Example 15

Perylene Pigment III

The procedure was analogous to example 13a), except that 66.4 g of 1,8-diamino-naphthalene and 450 g of N-methylimidazole were used, and 450 g of methanol were added dropwise for dilution.

123.4 g of a black powder were obtained, which corresponds to a yield of 97%. The primary crystals were of pigmentary dimension and had a size in the range from 50 to 200 nm.

B) Testing

B1) Determination of the Blackness Value

To determine the full shade coloristic properties, a mixture of in each case 1.0 g of the particular pigment and 9.0 g of an alkyd/melamine baking varnish (binder content of 43% by weight, adjusted to 35% by weight using xylene) were shaken on a Skandex dispersion unit with 10 ml of glass beads (diameter 3 mm) in a 30 ml glass bottle for 60 min. The resulting paste was subsequently applied as a 150 μm-thick layer to cardboard, vented and baked at 130° C. for 30 min.

After calorimetric evaluation using a Spectraflash SF 600 plus spectrophotometer (from Datacolor), the blackness value was calculated by the following formula from the standard color value Y:

$$\text{Blackness value} = 100 \times \log(100/Y)$$

The blackness values determined are compiled in Table 1. For comparison, the blackness values determined analogously for a carbon black pigment (Monarch 1400 from Cabot) (C1) and also for the isomer mixture prepared analogously to Example 2 of WO-A-03/10241 (C2) are also listed.

TABLE 1

| Pigment from | Blackness value |
|---|---|
| Example 1 | 215 |
| Example 2 | 246 |
| Example 3 | 268 |
| Example 4 | 218 |
| Example 5 | 232 |
| Example 6 | 250 |
| Example 7 | 254 |
| Example 8 | 232 |
| Example 9 | 285 |
| Example 10 | 243 |
| Example 11 | 240 |
| Example 12 | 230 |
| Example 13 | 223 |
| Comparative example C1 | 268 |
| Comparative example C2 | 198 |

B2) Testing of Heat Development

In order to simulate the interior heating under solar irradiation which is caused by metal sheets (standard construction: CED layer plus standard filler varnished) which are coated with varnishes having black pigmentation, the varnished metal sheets (color pastes analogous to B1), but only 5% pigmented; layer thickness only 30 μm) were placed on a Styropor box as a lid with the varnished side facing upward and irradiated by the method described in EP-A-1 219 684 using a halogen lamp at a distance of 40 cm with an output of 750 W. The internal temperature in the box was then measured after irradiation for 10, 20, 30 and 35 min.

The test results are compiled in Table 2. For comparison, those for the primed metal sheet (C0) and also for the metal sheet varnished analogously (FW 200 lamp black, Degussa) (C3) are also listed.

TABLE 2

| Pigment from | Internal temperature after | | | |
|---|---|---|---|---|
| | 10 min | 20 min | 30 min | 35 min |
| Example 1 | 59° C. | 70° C. | 73° C. | 73° C. |
| Example 3 | 62° C. | 72° C. | 75° C. | 75° C. |
| Primed metal sheet (C0) | 58° C. | 69° C. | 72° C. | 72° C. |
| Comparative example C3 | 69° C. | 82° C. | 83° C. | 84° C. |

These results demonstrate that there is higher transmission in the IR region for the metal sheets varnished with the inventive perylene pigments in comparison to C3, which leads to stronger reflection of the IR radiation at the substrate and thus to lower interior heating, i.e. better heat protection. The comparison with the primed metal sheet (C0) shows that the observed residual heating can be attributed almost exclusively to the absorption of the IR radiation by the primer.

B3) Coloring of Plastics a) LD Polyethylene:

To determine the full shade coloristic properties in LDPE, the particular pigments and LDPE powder (pigment concentration 0.2% by weight) were mixed and processed on a mixing roll unit at a roll temperature of 160° C. and 200 roll revolutions to give a rolled sheet of thickness 0.4 mm. The rolled sheet was subsequently compressed to give slabs in a press with a spacer frame (1 mm) at 180° C. The black-colored slabs obtained in each case were evaluated colorimetrically using a Spectraflash SF 600 plus spectrophotometer (from Datacolor).

The test results obtained are compiled in Table 3.

TABLE 3

| Pigment from | a* | b* |
|---|---|---|
| Example 1 | 0.35 | 0.07 |
| Example 3 | −0.04 | −2.01 |
| Example 8 | −0.04 | 0.53 |
| Example 11 | 0.90 | −1.90 | b) HD Polyethylene and Industrial Plastics:

To determine the full shade coloristic properties in HDPE (Lupolen® 6031 M; Basell), polypropylene (PP; Moplen® 466R; Basell), polycarbonate (PC; Makrolon® 2800 N; Bayer), nylon-[6] (PA 6; Ultramid® BS 700; BASF), acrylonitrile/butadiene/styrene copolymer (ABS; Terluran® GP 22; BASF) and polymethyl methacrylate (PMMA; Plexiglas 7 N; Röhm), the particular pigment and polymer (pigment concentration 0.2% by weight) were mixed in a glass bottle for 30 min on a roller board, homogenized once using a double-screw extruder (ZSE 27/GL-44D; from Leistritz) at the bulk temperature $T_1$° C. specified in Table 4 and granulated. The thus obtained colored granule was then processed using an injection-molding machine (Allrounder; from Arburg) at the injection temperature $T_2$° C. to give plaques.

The black-colored injection-molded plaques obtained in each case were evaluated colorimetrically using a spectrophotometer (Spectraflash SF 600 X; from Datacolor).

The test results obtained, and also the thermal resistances TR [°C.] determined in the particular polymers in a 1/10 white reduction to DIN 53772, are compiled in Table 4.

TABLE 4

| | | | Pigment from Ex. 1 | | | Pigment from Ex. 3 | | |
|---|---|---|---|---|---|---|---|---|
| Polymer | $T_1$ [° C.] | $T_2$ [° C.] | a* | b* | TR [° C.] | a* | b* | TR [° C.] |
| HDPE | 215 | 220 | 4.3 | −6.8 | 320 | 2.6 | −6.5 | >320 |
| PP | 200 | 240 | −0.6 | 3.1 | 320 | 1.1 | −4.2 | >320 |
| ABS | 250 | 240 | 7.1 | −13.1 | 320 | 3.0 | −9.3 | 310 |
| PA 6 | 240 | 240 | 3.6 | −0.5 | 300 | 2.2 | −5.7 | >320 |
| PMMA | 265 | 240 | 0.0 | 6.2 | >320 | 0.8 | 0.2 | >320 |
| PC | 290 | 280 | 2.2 | 6.8 | >320 | −0.1 | 0.2 | >320 |

B4) Coloration of Varnishes a) Determination of the Full Shade Coloristic Properties According to B1), the pigment from Example 3 was used to produce a color paste which was varnished.

The colorimetric evaluation of the black varnish with a Spectraflash SF 600 plus spectrophotometer (from Datacolor) gave the following measurements:

a*=0.2; b*=−0.8.

B) Coloristic Properties in a White Reduction 1.6 g of the color paste from B4a) were mixed with 1.0 g of a white paste having 40% by weight pigmentation with titanium dioxide (Kronos 2310) (white reduction approx. ⅓ standard color depth), applied as a 150 μm-thick layer to cardboard, vented and baked at 130° C. for 30 min.

The colorimetric evaluation of the gray varnish with a Spectraflash SF 600 plus spectrophotometer (from Datacolor) gave the following measurements:

a*=5.3; b*=−14.4.

What is claimed is:

1. A black perylene pigment, comprising an isomer according to formula Ia, an isomer according to formula Ib, or a mixture thereof

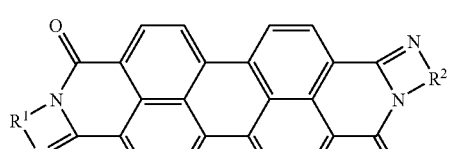

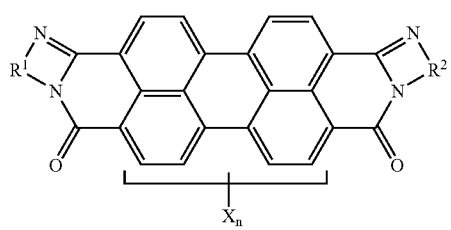

wherein:
  $R^1$, $R^2$ are each independently phenylene, naphthylene or pyridylene, each of which may be mono- or polysubstituted by $C_1$-$C_{12}$-alkyl, $C_1$-$C_6$-alkoxy, hydroxyl, nitro and/or halogen;
  X is halogen;
  n is from 0 to 4; and
  the pigment has a blackness value ≧210 when provided in an alkyd/melamine baking varnish.

2. The perylene pigment according to claim 1, wherein;
$R^1$ and $R^2$ radicals are the same and are each selected from the group consisting of unsubstituted phenylene and naphthylene; and
$R^1$ and $R^2$ are the same.

3. A process for preparing the perylene pigment according to claim 1, comprising:
obtaining a crude perylene pigment; and
subjecting the crude perylene pigment to a treatment selected from the group consisting of:
a) comminution;
b) comminution and recrystallization in a liquid medium; and
c) comminution with simultaneous recrystallization.

4. The process according to claim 3, wherein the crude pigment is subjected to high-energy powder grinding.

5. The process according to claim 3, wherein the crude pigment is initially subjected to dry grinding in the presence or absence of a salt as a grinding assistant and then to a-recrystallization in an organic solvent, under hot conditions.

6. The process according to claim 3, wherein the crude pigment is subjected to kneading under hot conditions in the presence of an organic solid having recrystallizing action and &-an inorganic salt.

7. The process according to claim 3, wherein the crude pigment is subjected to aqueous wet grinding in the presence of an organic solvent having recrystallizing action.

8. A process for preparing perylene pigments according to claim 1, comprising:
obtaining a crude perylene pigment; and
subjecting the crude perylene pigment to swelling in a concentrated acid.

9. The process according to claim 3, wherein obtaining the crude pigment comprises:
condensing perylene-3,4:9,10-tetracarboxylic dianhydride with an aromatic ortho- or peri-diamine; and
subsequently cyclizing in the presence of phenol or a nitrogen-containing, nonfused heteroaromatic;
wherein the aromatic ortho- or pen-diamine comprises at least one member selected from the group consisting of $R^1$ and $R^2$.

10. The process according to claim 3, wherein the process is carried out in the presence of a pigment synergist and/or a pigment additive.

11. The process according to claim 5, wherein recrystallization is carried out in a mixture of the organic solvent and water.

12. The process according to claim 8, wherein swelling is carried out subsequent to comminution.

13. A method, comprising:
coloring high molecular weight organic and inorganic materials of natural and synthetic origin with the perylene pigment according to claim 1.

14. The process according to claim 13, wherein the high molecular weight organic and inorganic materials are selected from the group consisting of coatings, inks toners, polymers, paints, plastics articles, glasses, silicatic layer systems and organic-inorganic composites.

15. A method, comprising:
coloring plastics articles that are used for laser penetration welding with the perylene pigment according to claim 1.

16. A method, comprising:
coloring natural or synthetic leather materials with a perylene pigment according to claim 1.

17. A method, comprising:
incorporating the perylene pigment according to claim 1 into a charge-generating material for electrophotography or a constituent of a black matrix in an LC display.

18. A method, comprising:
incorporating the perylene pigment according to claim 1 into a water-, polymer- or polyolefin wax-based pigment preparation.

19. A process for preparing a crude perylene pigment comprising an isomer of the formula Ia, an isomer of the formula Ib, or a mixture thereof

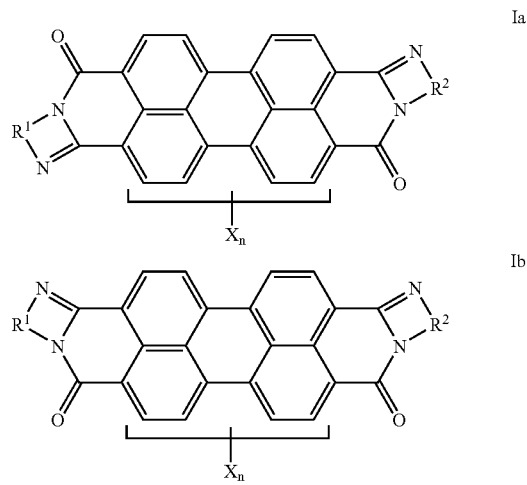

wherein:
$R^1$, $R^2$ are each independently phenylene, naplithylene or pyridylene, each of which may be mono- or polysubstituted by $C_1$-$C_{12}$-alkyl, $C_1$-$C_6$-alkoxy, hydroxyl, nitro and/or halogen;
X is halogen; and
n is from 0 to 4;
the process comprising:
condensing perylene-3,4:9,10-tetracarboxylic dianhydride with an aromatic ortho-diamine; and
subsequently cyclizing;
wherein:
the aromatic ortho- or peri-diamine comprises at least one member selected from the group consisting of $R^1$ and $R^2$; and
condensing and cyclizing are carried out in phenol or a nitrogen-containing, nonfused heteroaromatic as a reaction medium.

20. The process according to claim 19, wherein the process is carried out in the presence of a pigment synergist and/or a pigment additive.

21. A pigment synergist, comprising an isomer of the formula Ia', an isomer of the formula Ib', or a mixture thereof

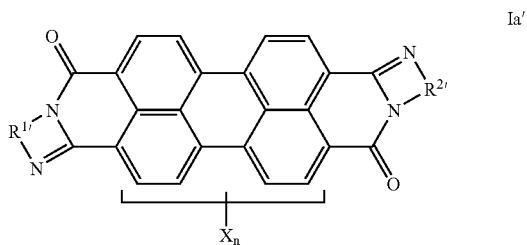

-continued

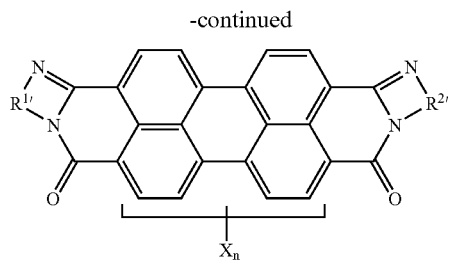

Ib' wherein:

R¹', R²' are each independently phenylene, naphthylene or pyridylene, each of which is mono- or polysubstituted by —COO— M+, —COOR3, —CONR³R⁴, —COO— N+R³R⁴R⁵R⁶, —SO₂NR³R⁴, —CH₂NR³R⁴, —CH₂N+R³R⁴R⁵R⁶R³—COO⁻ and/or —CH₂R⁷, and may additionally be mono- or polysubstituted by $C_1$—$C_{12}$-alkyl, $C_1$—$C_6$-alkoxy, hydroxyl, nitro and/or halogen;

$R^3, R^4, R^5, R^6$ are each in dependently hydrogen; $C_2$-$C_{12}$-alkyl or $C_2$-$C12$-alkenyl whose hydrocarbon chain may in each case be interrupted by one or more —O—, —S—, —NR⁸—, —CO— or —SO₂— moieties, and/or be mono- or polysubstituted by hydroxyl, halogen, aryl, $C_1$-$C_4$-alkoxy and/or acetyl; $C_3$-$C_8$-cycloalkyl whose carbon skeleton may be interrupted by one or more —O—, —S—, —NR⁸— or —CO— moieties, and/or be substituted by acetyl;

$R^7$ is phthalimidyl;
$R^8$ is hydrogen or $C_1$-$C_8$-alkyl;
$M^+$ is hydrogen or a metal cation;
X is halogen; and
n is from 0 to 4.

* * * * *